United States Patent [19]

Teitel

[11] 4,211,537

[45] Jul. 8, 1980

[54] HYDROGEN SUPPLY METHOD

[76] Inventor: Robert J. Teitel, 13944 Boquita Heights, Del Mar, Calif. 92014

[21] Appl. No.: 927,203

[22] Filed: Jul. 24, 1978

[51] Int. Cl.$^2$ .................................................. F17D 3/01
[52] U.S. Cl. ...................................... 48/191; 60/39.02; 123/3; 123/DIG. 12; 206/0.7; 423/648 R
[58] Field of Search ............. 48/190, 191; 423/648 R, 423/645, 248; 165/DIG. 17; 62/48; 206/0.7, 0.6, 524.1; 123/DIG. 12, 3; 65/21; 252/316; 60/39.02, 39.12, 39.46 G; 137/266, 571

[56] References Cited

U.S. PATENT DOCUMENTS

| | | | |
|---|---|---|---|
| 2,797,201 | 6/1907 | Veatch et al. | 65/21 |
| 3,350,229 | 10/1967 | Justi | 62/48 |
| 3,703,976 | 11/1972 | Hughes et al. | 220/88 R |
| 3,732,690 | 5/1973 | Meijer | 48/190 |
| 4,026,499 | 5/1977 | Crosby | 206/0.6 |

FOREIGN PATENT DOCUMENTS

2514834  6/1975  Fed. Rep. of Germany .............. 65/21

OTHER PUBLICATIONS

"The UCLA Hydrogen Car", Bush et al. Advances in Cryogenic Engr. 1973, pp. 23–27.
"Metal Hydride Storage for Mobile and Stationary Applications" Hoffman et al. SAE Fuels & Lubricants Meeting, 1976.

*Primary Examiner*—S. Leon Bashore
*Assistant Examiner*—Peter F. Kratz
*Attorney, Agent, or Firm*—Kay H. Boswell; Edward D. O'Brian

[57] ABSTRACT

A system for supplying hydrogen to an apparatus which utilizes hydrogen, contains a metal hydride hydrogen supply component and a microcavity hydrogen storage hydrogen supply component which in tandem supply hydrogen for the apparatus. The metal hydride hydrogen supply component includes a first storage tank filled with a composition which is capable of forming a metal hydride of such a nature that the hydride will release hydrogen when heated but will absorb hydrogen when cooled. This first storage tank is equipped with a heat exchanger for both adding heat to and extracting heat from the composition to regulate the absorption/deabsorption of hydrogen from the composition. The microcavity hydrogen storage hydrogen supply component includes a second tank containing the microcavity hydrogen supply. The microcavity hydrogen storage contains hydrogen held under high pressure within individual microcavities. The hydrogen is released from the microcavities by heating the cavities. This heating is accomplished by including within the tank for the microcavity hydrogen storage a heating element.

7 Claims, 4 Drawing Figures

HYDROGEN SUPPLY METHOD

BACKGROUND OF THE INVENTION

This invention pertains to a system for supplying hydrogen to a hydrogen utilizing apparatus utilizing a combination of a metal hydride hydrogen storage and microcavity hydrogen storage.

Because from an environmental standpoint hydrogen can be cleanly used, because hydrogen has a large capacity for energy transference, and because there is a reversible supply of hydrogen in the form of water, the utilization of hydrogen as a fuel for many different systems is becoming incresingly important. Hydrogen can be used as a fuel in apparatuses which are powered by combustion engines wherein hydrogen is oxidized and the energy obtained in this oxidation process is used to power the engine with the only product of oxidation being water. Additionally hydrogen can be used as a fuel for electrical energy generation utilizing either the heat of combustion to drive conventional steam turbines or direct use of hydrogen within fuel cells.

At all temperatures except cryogenic temperatures hydrogen exists as a gas. The storage of large supplies of hydrogen as a gas presently is done by compressing the hydrogen and storing in large tanks. However, because the hydrogen is under high pressure it is necessary that these tanks to very strong which in turn necessitates very thick walls and heavy tanks. When hydrogen is stored as a liquid at cryogenic temperatures, as with hydrogen as a gas, cryogenic liquid hydrogen must also be contained in strong, heavy tanks and additionally there is an energy penalty in the liquefaction process. Aside from the weight disadvantages of hydrogen storage in tanks both as a liquid and a gas, the storage tank must be designed and constructed of suitable materials to accommodate and control the permeability and reactivity of hydrogen with most metals.

It has been proposed to store hydrogen chemically bound in a chemical carrier such as methylcyclohexane which is catalytically converted to toluene and hydrogen, the hydrogen being used as fuel and the toluene being recycled back to methylcyclohexane. Use of such a system requires two transporation networks, one for the delivery of the methylcyclohexane to a service station for dispensing to the consumer, the other for the return of the toluene to a reconversion plant to be hydrogenated into methylcyclohexane. This type of system is still in a semihypothetical state and much technology remains to be developed until each systems can hope to be functional.

A system now being field tested for utilizing hydrogen as a fuel to propel an automobile involves the use of a metal hydride as the carrier for the hydrogen fuel. Basically this system involves having a storage tank filled with a metal that reversibly forms a metal hydride. In the presence of hydrogen and the withdrawal of heat, the metal absorbs the hydrogen forming a metal hydride. Upon the application of heat the hydride disassociates into the metal and hydrogen allowing the hydrogen to be utilized as fuel. The heat to disassociate the metal hydride is obtained from the hot exhaust gases from the engine. Currently two metal hydride systems are being studied for use in automobiles. One system is based upon a hydride of an iron titanium alloy and the second system is based upon hydrides of magnesium alloys.

The disadvantage of a total metal hydride system is that the system is both heavy and expensive. The weight problem becomes critical in mobile applications such as automobiles, buses, etc., wherein transportation of the added weight reduces the fuel economy of the vehicle. In stationary system such as systems utilizing hydrogen in the generation of electricity, weight of the system is not the critical factor however, in these systems wherein large quantities of metal hydrides will be required the economics of the system become critical.

An additional factor to be considered in mobile systems such as automobile usage of metal hydride systems is the refueling (i.e. regenerating the metal hydride) of the on board metal hydride vehicle storage tank. During refueling the vehicle storage tank would have to be coupled to a unit which withdrew heat from the storage tank allowing for the regeneration of the metal hydride. This would require at complex hookup of hydrogen supply line and cooling line. Compared to the typically five minute stop now necessary to obtain a supply of gasoline, the regeneration of the metal hydride could require a prolonged fuel stop.

BRIEF SUMMARY OF THE INVENTION

In view of the above it is evident that there is a need for new and improved systems which supply hydrogen to an apparatus utilizing hydrogen as a fuel. It is therefore a broad object of this invention to fulfill this need. It is a further object of this invention to provide a hydrogen supply system which is not as expensive as an exclusively metal hydride hydrogen system. Additionally it is an object of this invention to furnish a system which has a hydrogen capacity similar to that of liquid hydrogen yet does not involve the dangerous usage of large quantities of either liquid or gaseous hydrogen. Additional objects include a hydrogen supply system which will deliver hydrogen at greater than atmospheric pressure to the apparatus which will use the hydrogen yet does not require equilibrium storage pressures greater than approximately 50 or 60 atm.

These and other objects are fulfilled by providing a hydrogen supply system which utilizes a metal hydride hydrogen supply component and a microcavity hydrogen storage hydrogen supply component both components supplying hydrogen to an apparatus using hydrogen and additionally the microcavity hydrogen storage hydrogen supply component supplying hydrogen to recharge the metal hydride hydrogen supply component and the system incorporates the metal hydride hydrogen supply component including a storage tank filled with a composition including a metal capable of forming a metal hydride and having a heat exchanger to regulate the temperature of the metal hydride to control absorption/deabsorption of hydrogen from the hydride and the microcavity hydrogen storage hydrogen supply component includes a storage tank containing a microcavity hydrogen storage and a heating element for heating the microcavity hydrogen storage to release hydrogen from the microcavity hydrogen storage and further having regulating valves within the system to regulate the flow of hydrogen from both the metal hydride hydrogen supply component and the microcavity hydrogen storage hydrogen supply component to the hydrogen utilizing apparatus and the flow of hydrogen from the microcavity hydrogen storage hydrogen supply component to the metal hydride hydrogen supply component.

BRIEF DESCRIPTION OF THE DRAWING

The invention will be better understood when taken in conjunction with the following drawings in which.

The invention in this specification utilized certain operative concepts or principles as are set forth and defined in the appended claims forming a part of the specification. Those skilled in the art to which this invention pertains will realize that these concepts or principles can easily be applied to a number of differently appearing and differently described embodiments and for this reason the invention is not to be construed to be limited to the illustrated embodiments but is to be construed in light of the claims.

DETAILED DESCRIPTION

Figure 1:
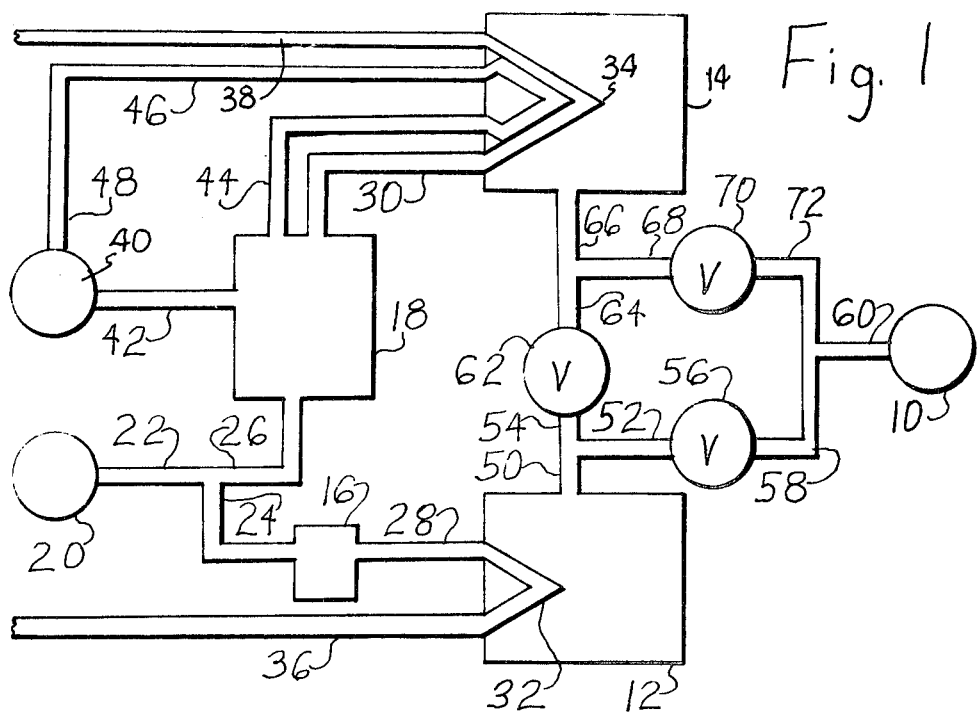
FIG. 1 is a schematic view of the components of the invention.

FIG. 1 shows a generalized embodiment of the invention wherein a hydrogen consuming apparatus 10 is supplied with hydrogen utilizing the hydrogen supply system of the invention. The apparatus 10 could be an energy generating apparatus such as a combustion engine or a fuel cell or it could also be a process plant which utilizes hydrogen as a chemical reactant. Typical process plants include those producing organic chemicals or fertilizers and steel mills which utilize hydrogen as a reducing agent.

In any event hydrogen is supplied to the hydrogen consuming apparatus 10 by a supply system which has a microcavity hydrogen storage hydrogen supply component 12 and a metal hydride hydrogen storage hydrogen supply component 14. The metal hydride component 14 supplies hydrogen for short term hydrogen utilization needs such as peak loading or acceleration. The microcavity component 12 supplies an overall constant demand for hydrogen and is also used to regenerate or refuel the metal hydride component 14.

To release hydrogen from both component 12 and component 14 these respective components are supplied with heat which causes both the microcavity hydrogen supply and the metal hydride hydrogen supply to release hydrogen. For energy generating apparatuses such as fuel cells or combustion engines the usual source of this heat is the waste heat given off by either the engine or the fuel cell.

The control of the rate of discharge of hydrogen from both component 12 and 14, as hereinafter discussed, is governed by the control of the rate of heating of the components 12 and 14. To achieve this the components 12 and 14 are equipped with heat or thermocontrols 16 and 18. Thermocontrol 16 is a monofunctional control which controls the addition of heat to the microcavity component 12 while thermocontrol 18 is a bifunctional control which controls both the addition of heat and the withdrawal of heat from the hydride component 14. Thus, the temperature of the hydride component 14 can be regulated in accordance with the pressure of the hydrogen in the microcavity component 12 so that the pressure of hydrogen within said hydride component remains substantially constant. Heat energy is supplied to thermocontrols 16 and 18 from a common heat source 20 which in an energy generating apparatus would be waste heat from the apparatus. From heat source 20 heat is supplied to the thermocontrols 16 and 18 via heat supply line 22 having branches 24 and 26 going to components 16 and 18 respectively. From the thermocontrols 16 and 18 heat is conducted by heat supply lines 28 and 30. Line 28 supplies heat to heating element 32 in component 12 and line 30 supplies heat to heat exchanger 34 in component 14.

For an energy utilizing apparatus the heat is generally supplied as a heated fluid. Thus the supply lines, the heating element and the heat exchanger comprise hollow tubes in which this heated fluid flows.

In both energy utilizing apparatuses and other apparatuses the heat energy could be supplied as electrical energy and thus heat source 20 would be a source of electrical energy and heat supply lines, 22, 24, 26, 28, and 30 would represent electrical conduits. Heating element 32 and heat exchanger 34 would include resistance elements capable of releasing heat upon the flow of electric current. In the event that heat is supplied via a fluid, heating element 32 and heat exchanger 34 would be connected to exhaust lines 36 and 38 respectively for discharge of the fluid from the heating element 32 and heat exchanger 34. In the event heat is supplied as electrical energy, lines 36 and 38 would represent electrical connections allowing for a complete circuit. The heat exchanger 34 in component 14 is also connected to a coolant supply source 40 via lines 42 and 44. Interspaced between lines 42 and 44 is thermal control 18 which in addition to the control of heat to heat exchanger 34 also controls the flow of coolant to heat exchanger 34. Line 44 is connected to heat exchanger 34 and heat exchanger 34 is also equipped with a coolant exhaust line 46 for discharging exhausted coolant from the heat exchanger 34. Alternately the exhausted coolant could be recycled back to coolant supply 40 via line 48 shown in phantom.

Hydrogen gas released from component 12 is supplied to component 14 and apparatus 10 and hydrogen gas released from component 14 is supplied to apparatus 10. Both of these supply systems are accomplished by a series of conduits having flow control valves to control the flow of hydrogen. Conduit 50 supplies hydrogen gas to conduits 52 and 54. Conduit 52 leads to flow control valve 56 and from flow control valve 56 hydrogen gas flows through conduits 58 and 60 to apparatus 10. Additionally hydrogen gas is supplied to component 14 from component 12 via conduit 54, flow control valve 62 and conduits 64 and 66. Hydrogen gas from component 14 is supplied to apparatus 10 via conduits 66, 68, flow control valve 70, conduit 72 and conduit 60.

The microcavity storage component 12 consists of a large plurality of microcavities filled with hydrogen gas at pressures up to 10,000 psi. The microcavities generally are from about 5 to about 500 microns in diameter. The walls of the microcavities are generally from about 0.01 to about 0.1 that of the diameter of the microcavities.

Generally the microcavities are microspheres. Microspheres, however, can be sintered together to form porous structures having both interconnecting pores and closed micropores. The interconnecting pores provide access to the closed microcavity pores throughout the sintered structure.

In the form of individual microspheres, the filled microspheres may be moved from operation to operation like a fine sand or suspended in gas or fluids for transportation. Porous structures, however, offer the advantage of simpler handling. For example, porous cannisters of sintered microspheres could be filled and later inserted in tubes which are equipped with an outlet through which the hydrogen would be released.

Hollow microspheres can be made of plastic, carbon, metal, glasses or ceramics depending upon the performance characteristics desired. Generally the microspheres will be made of silicate glasses such as Emerson-Cuming SI grade high silica containing microspheres.

Under high hydrogen pressures and elevated temperatures hydrogen will diffuse into the microcavities. When stored at normal temperatures and under atmospheric pressure the hydrogen remains inside the microcavity under high pressure. Upon reheating the microcavity the hydrogen is caused to diffuse outside the cavity and is available for utilization by the apparatus 10. The time periods for diffusion into and diffusion out of glass microspheres are estimated by the following equations:

$$\text{(Diffusion in) } t_I = \frac{x\,r}{0.837\,KT}\left(-\ln\frac{P_0 - P_i}{P_0}\right) \tag{1}$$

where $t_I$ = Diffusion in period (sec); x = wall thickness (mm); r = radius of the microsphere (cm); K = hydrogen permeability [cm$^3$ (STP) mm/sec.cm$^2$ (cm of Hg)]; T = temperature (°K.); $P_0$ = pressure outside the microsphere (atm); $P_i$ = pressure within the microshpere (atm).

and $$\text{(Diffusion out) } t_O = \frac{xr}{0.837\,KT}\left(-\ln\frac{P_2 - P_0}{P_1 - P_0}\right) \tag{2}$$

where $P_1$ = initial pressure inside the microsphere; $P_2$ = internal pressure at time $t_0$; $t_0$ = Diffusion out period (sec).

The following general assumptions are implicit in the use of the above equations.
1. Uniform glass composition.
2. Uniform microsphere size and wall thickness.
3. Isothermal conditions during hydrogen permeation.
4. Constant external pressure during diffusion.

Both of these equations can be similarly derived and in the interest of brevity only the derivation of equation 1 is herein described.

Equation 1 is premised upon equation 3 relating to hydrogen permeability in silicate glasses incorporating glass composition and temperature.

$$K = 2.947 \times 10^6 \left\{[3.4 + (8 \times 10^{-4})\,(M)^3]10^{-17}\right\}T\exp - \frac{(3600 + 165M)}{T} \tag{3}$$

where K = the hydrogen gas permeability [cc of gas (STP) mm/cm$^2$ (cm of Hg) sec]; M = the mol percent of nonnetwork formers in the glass, e.g., CaO and Na$_2$O; T = the absolute temperature (°K.).

Derivation to this above relationship in equation 3 has been observed for hollow microspheres having thin walls (1.5 to 1.5 microns). It is postulated that this derivation is caused by high internal pressure. However, since in the present invention the use of very thin walls is not required, it will be assumed that equation 3 expressing the gas permeability of hydrogen in silicate gases is controlling.

Equation 4 expresses the flow of gases using experimentally determined permeability constants. Equation 4 is derived from Ficks' Law, a general equation for diffusion, by imposing the condition of a constant pressure across the glass walls. Under general conditions for filling hollow glass microspheres, the pressure outside the spheres is held constant while the pressure inside the spheres increases as the spheres fill. Consequently the rate of diffusion decreases as the filling proceeds. Ficks' Law for diffusion can then be solved for the condition of filling glass spheres using experimentally determined permeability constants instead of the diffusion coefficient. The derived differential formed is then given by equation 5.

$$Q/A = (K\Delta P)/x \tag{4}$$

where Q = the volume of transported gas measured at STP (cm$^3$/sec); K = the permeability constant [cm$^3$(gas at STP) mm/cm$^2$ sec (cm of Hg)]; $\Delta P$ = the pressure gradient across the glass wall (cm of Hg); x = the wall thickness (mm); and A = the area (cm$^2$).

$$dq = \frac{KA}{x}(P_O - P_i)\,dt \tag{5}$$

where q = the volume of gas transport in time $t_I$; A = diffusion area (cm$^2$); $t_0$ = Diffusion out period (sec); $P_0$ = pressure outside the glass sphere; and $P_i$ = pressure within the glass sphere at time $t_0$.

Since by definition q is measured under standard temperature and pressure, it is simply the mass of diffused gas as indicated in equation 6.

$$dm = \frac{M\,dq}{2.24 \times 10^4} \tag{6}$$

where M = the gram molecular weight of hydrogen.

Now equations 5 and 6 can be combined to give equation 7.

$$\frac{dm}{P_O - P_i} = \frac{KAM\,dt_{DI}}{(2.24 \times 10^4)\,x} \tag{7}$$

Pressure within the glass sphere ($P_i$) at time $t_I$ is a function of the mass of hydrogen diffused through the wall according to Equation 7. For most gases, the density is directly proportional to pressure. At high hydrogen pressures, a compressibility term (Z) must be used according to Equation 8.

$$P_i = \frac{ZRT}{V}m \tag{8}$$

where R = the gas constant for hydrogen; T = the absolute temperature (°K.); V = volume of the glass sphere (cm$^3$).

For the purposes of deriving equation 1 the compressibility term is set at one and equations 7 and 8 are combined and rearranged giving equation 9.

$$\int_O^m \frac{dm}{\frac{P_OV}{RT} - m} = \int_O^t \frac{KRTM}{(2.24 \times 10^4)\,x}\,\frac{A}{V}\,dt. \tag{9}$$

The hydrogen gas constant (R), using consistent units, is $6.24 \times 10^3/M$. The ratio of the area to volume for a sphere (A/V) is 3/r, where r is the radius of the glass sphere. These values were incorporated into equation 9 and result in equation 10.

$$\int_0^m \frac{dm}{\frac{P_oV}{RT} - m} = \int_0^t \frac{0.837\, KT}{x\, r}\, dt. \qquad 10.$$

Integration of equation 10 yields equation 11 which upon rearrangement gives us equation 1.

$$-\ln\frac{P_o - P_i}{P_o} = \frac{0.837\, KT}{x\, r}\, t_f \qquad 11.$$

The permeability of the microsphere wall can be modified by coating the wall. Typical coatings would include plastics and metals. Metal coatings are of a particular desired utility in that they can be used to reduce the permeability of hydrogen from the microsphere at storage temperatures but not interfere with the diffusion of hydrogen into and out of the microsphere at elevated temperatures during filling the microspheres or dispensing of the hydrogen from the microspheres. Metal coatings may be applied by electroless and electroplating, chemical vapor decomposition or centrifugal coating techniques. Typical metals suitable for coating silicate glass microspheres include aluminum, molybdenum, nickel, copper and their alloys.

The metal hydride hydrogen storage component 14 utilizes a composition having at least one metal which will form a metal hydride when exposed to hydrogen. Additionally other metals can be alloyed with the primary metal to alter the characteristics of the final metal hydride. The base metal chosen and any additional metals alloyed with it will be governed by the apparatus to which hydrogen is supplied. The criteria governing which metal hydride will be used is the hydride heat of formation. If waste heat from apparatus 10 is used to heat the metal hydride to liberate hydrogen the metal hydride must be capable of liberating hydrogen within the heat range of the waste heat in order to conserve energy and not require expenditure of additional energy for heating the metal hydride.

As noted in the background of the invention currently two hydride systems are being studied for use in a hydrogen fuel automobile. These systems are based upon iron titanium and magnesium alloys. An alloy of equal molar amount of iron and titanium has a heat of formation in kcal. of $-5.5$ per mole of hydrogen. Magnesium hydride has a heated formation of $-17.8$ kcal. per mole of hydrogen. By alloying magnesium with nickel or copper the heated formation can be made smaller. Typically a nickel alloy having a composition $Mg_2Ni$ has a heated formation of $-15.4$ kcal. per mole. Hydrides which have a high decomposition pressure at low temperatures generally have a relatively small value of heat of formation. Magnesium nickel hydride has a dissociation temperature of about 300° C. The dissociation temperature can be reduced by adding zinc to the alloy giving a dissociation temperature of approximately 260° C. Other metals having usable heats of formation which may be used to form the metal hydride include vanadium, niobium, palladium and an alloy "Misch metal". Also known to form hydrides are potassium, uranium, zirconium, calcium, lithium and cerium; however, they do have a large value of heat of formation.

Iron titanium hydride is heavier than magnesium nickel hydride; however, since iron titanium hydride has a heat of formation of only $-5.5$ kcal. the dissociation temperature of iron titanium hydride is only 25° C. For use in apparatuses 10 which utilize waste heat to liberate the hydrogen from the metal hydride, iron titanium hydride is the preferred metal alloy. Heating this hydride at modest temperatures will cause it to decompose and supply hydrogen at pressures of from about 100 to about 1000 psi.

The efficiency of the metal hydride is also dependent upon the surface area of the metal. The surface area can be greatly improved by cycling the metal through a series of hydride formation hydrogen liberation cycles. Thus the efficiency of the metal hydride as a hydrogen absorber or hydrogen liberator is increased with use. Initially, the hydride is primed by exposing it to several cycles of hydride formation-dissociation.

A useful property of the metal hydrides is that on a volume basis they can contain more hydrogen than cryogenic liquid hydrogen. Microspheres can contain almost as much volume of hydrogen as cryogenic hydrogen; however, as compared to the metal hydrides, the microspheres are able to effect this storage of hydrogen in a smaller unit weight.

Figure 2:
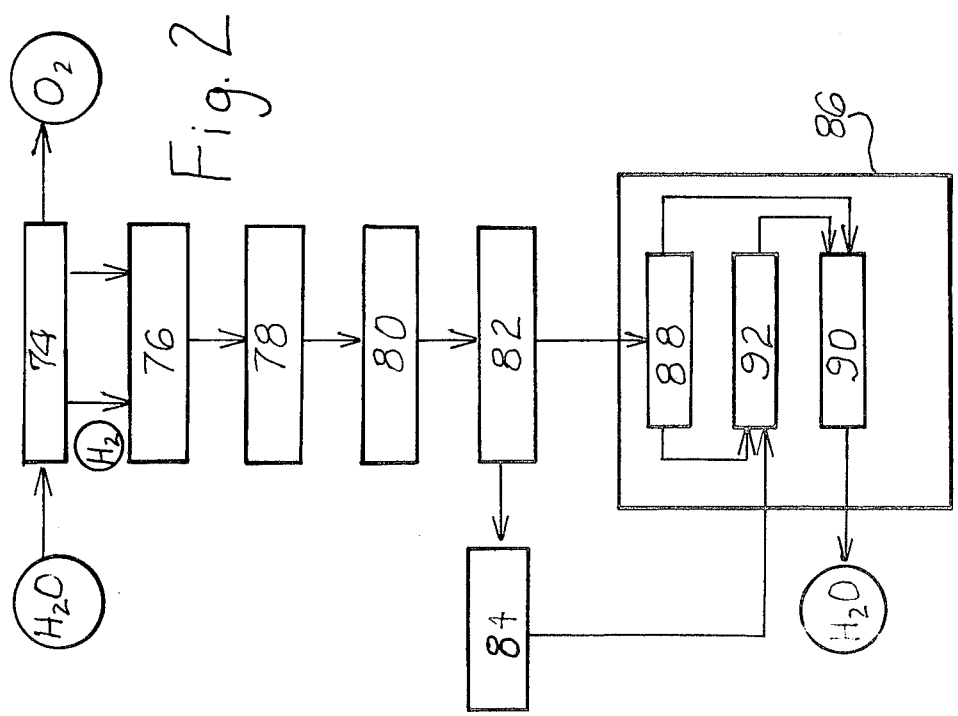
FIG. 2 is a schematic view of the steps between hydrogen production and utilization of hydrogen.

For further illustration of the invention in the remainder of this specification (a) the hydrogen utilization apparatus 10 will be illustrated by a combustion engine used to propel a vehicle most specifically an automobile; (b) the microcavity hydrogen storage component 12 will be microspheres; (c) the metal hydride storage component 14 will be iron titanium hydride. FIG. 2 shows an overall schematic for the utilization of hydrogen from production to power generation.

A hydrogen production plant 74 produces hydrogen by one of several methods. For example, water could be electrolized using conventional power systems, such as solar, fossil fuel or nuclear generation means. Other processes also may be available in the future such as radiochemical or thermochemical processes for hydrogen generation. In any event, water is converted to hydrogen and oxygen and the waste heat from this conversion is used to encapsulate the hydrogen in microspheres in an encapsulation plant 76 which preferably would be located near the production plant. By encapsulating the hydrogen at or near the hydrogen production plant there are several advantages. One, there is a potential economical gain from large scale production; two, waste heat from the production is utilized to encapsulate the hydrogen; and three, transportation of hydrogen is simplified by inclusion of the hydrogen in microspheres and as discussed below this form of transportation achieves a safety advantage.

After encapsulation the hydrogen can be stored in a long term storage facility 78 prior to delivery to a consumer. Since the hydrogen gas is contained in microspheres the pressure in any tanks used to hold the microspheres is much less than the pressure would be in tanks if the hydrogen was stored as either a liquid or a gas. This offers the advantage of reducing to a negligible level embrittlement of the storage tank or storage lines by hydrogen. For long term storage, storage tanks could be cooled to further prevent escape of hydrogen from the microspheres.

After storage the microspheres would be transported by a transporter 80 to regional service station dispensing units 82. The transportation of the microspheres could be effected by transporting tanks of microspheres on trucks, ships, railroad tank cars, etc. or the microspheres could be slurried in a transfer fluid such as nitrogen or air and transported by the fluid within a pipe line. At the receiving end of the pipe line the microspheres would be separated from the fluid using a cyclone separator or the like.

At the service station dispensing units 82 hydrogen from the microspheres could be used in hydride priming operations shown as block 84 and discussed above. However, the primary purpose of the service station dispensing unit 82 would be to dispense the hydrogen containing microspheres to a vehicle 86. On board the vehicle 86 there would be a microsphere storage tank 88 which is filled with the microspheres.

The hydrogen contained in the microsphere storage tank is utilized as a fuel source for the vehicle engine 90 and as a charging source for the metal hydride located in storage tank 92. The vehicle engine 90 burns the hydrogen and uses the power derived from the hydrogen to propel the vehicle. The waste product from this process is water; thus, completing the ecological cycle. It is further conceived that after the microspheres are emptied of their hydrogen they can be recycled to the encapsulating plant for refilling.

Figure 3:
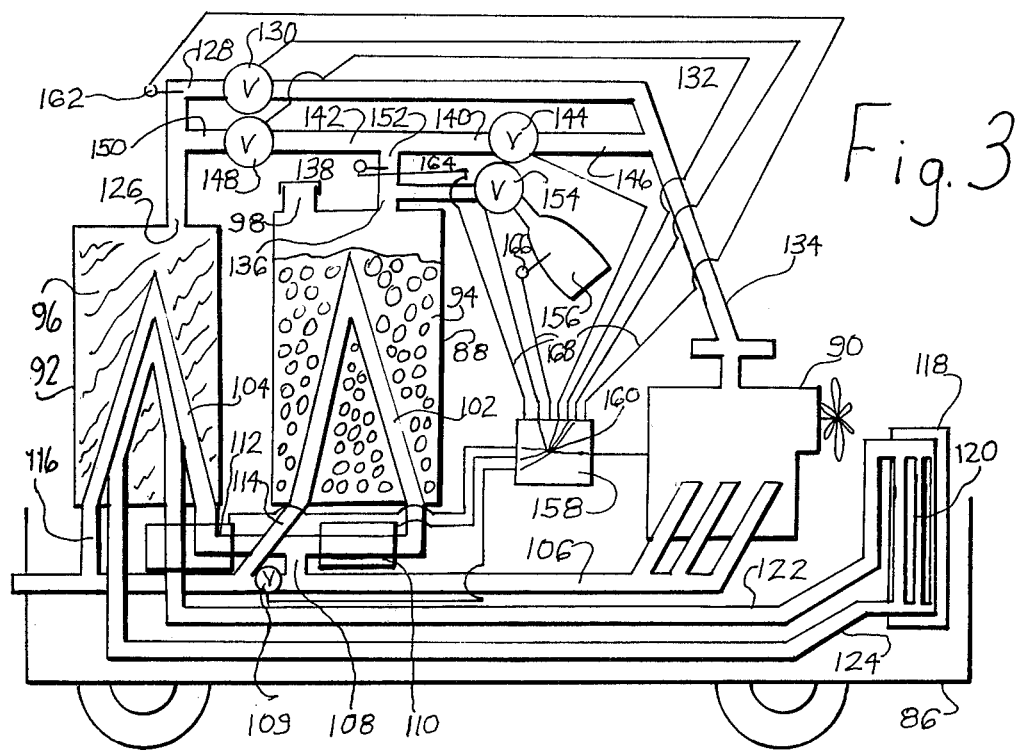
FIG. 3 is a side elevation in partial section and partial schematic showing a vehicle utilizing the invention.

As shown in FIG. 3 a vehicle 86 having an engine 90 is equipped with a microsphere storage tank 88 and a metal hydride storage tank 92. The storage tank 88 is filled with microspheres 94 and the storage tank 92 is filled with a metal hydride composition 96. Storage tank 88 has an opening 98 equipped with a cap allowing access to the tank for recharging the tank by filling the tank with a fresh supply of microspheres 94.

Within the interior of tank 88 is a heating element 102. Heating element 102 is a hollow tube in which hot gases pass through. Within the interior of tank 92 is heat exchanger 104 also having a hollow passageway for hot gases and in addition a second passageway for cooling fluid. An exhaust pipe 106 attaches to the exhaust manifold of engine 90 and conducts hot gases from the engine. A branch conduit 108 leads from exhaust pipe 106. Down stream from branch conduit 108 is a diverter valve 109 which when closed diverts exhaust gases in exhaust pipe 106 into branch conduit 108. Branch conduit 108 connects to two thermal controls, thermal control 110 controlling the flow of hot gases to heating element 102 and thermal control 112 controlling the flow of hot gases to heat exchanger 104. An exhaust pipe 114 leads from heating element 102 and feeds into exhaust pipe 106 down stream of the diverter valve 109. Likewise an exhaust pipe 116 leads from heat exchanger 104 to exhaust pipe 106.

Vehicle 86 has a radiator 118 for cooling engine 90. Integrated into radiator 118 are heat exchange pipes 120 which connect to coolant supply line 122 and coolant return line 124. Coolant flows through line 122 to thermal control unit 112. From thermal control unit 112 the coolant flows through the heat exchanger 104 in metal hydride tank 92 and then returns to the heat exchange pipes 120 via return line 124.

The metal hydride storage tank 92 has an opening 126 to which is attached hydrogen conduit 128. Conduit 128 connects to hydrogen flow valve 130. On the outlet side of flow valve 130 is hydrogen conduit 132 which connects to engine supply conduit 134. Microsphere storage tank 88 has an opening 136 to which a conduit 138 is attached. Conduit 138 leads into two branch conduits 140 and 142. Branch 140 connects to flow valve 144 and on the outlet side of flow valve 144 is conduit 146 which connects to engine supply conduit 134. Branch conduit 142 connects to flow valve 148 which has an additional conduit 150 attached to its outlet side which further connects to conduit 128.

Also connected to conduit 138 is conduit 152 having a two way flow valve 154. Flow valve 154 is connected to a small hydrogen gas reservoir 156.

A master control 158 is connected to the engine 90, thermal controls 110 and 112, the flow valves 130, 144, 148 and 154, and diverter valve 109 by appropriate control line all collectively identified by the numeral 160. Pressure sensing units 162, 164, and 166 are located in conduits 128, 138, and gas reservoir 156 respectively. These pressure sensing units are also connected to master control 158 by control line all collectively identified by the numeral 168.

In use, for engine start up, flow valves 144 and 154 are open upon command by the master control 158 allowing the residual hydrogen gas in tank 88 and the hydrogen gas in reservoir 156 to flow to the engine there to be utilized as fuel. After several minutes engine 90 reaches its operating temperature and the exhaust gases expelled by engine 90 become quite hot. Master control 158 signals diverter valve 109 to close and thermal control unit 112 to open allowing the hot exhaust gases to flow through heat exchanger 104. The heat exchanger heats up the metal hydride within tank 92 causing hydrogen to be released from the metal hydride. Flow valve 130 is open and hydrogen is fed to engine 90 from the metal hydride tank 92. Thermal control 110 is now opened by master control 158 allowing hot gases to pass through heating element 102 which initiates release of hydrogen from the microspheres 94.

As the flow of hydrogen being released from tank 88 increases, the flow of hydrogen from reservoir 156 is halted and reservoir 156 is repressurized to a predetermined level sensed by pressure senser 166. Valve 154 is then closed trapping a fresh quantity of hydrogen in reservoir 158 which will be used for the next engine start up. Depending on the fuel needs of the engine, master control 158 opens and closes thermal controls 110 and 112 and diverter valve 109 thereby governing the amount of hot gases passing heating element 102 and heat exchanger 104 which in turn governs the release of hydrogen from tanks 88 and 92.

As the metal hydride in tank 92 becomes depleted of hydrogen a pressure drop in tank 92 is signaled by pressure sensing unit 162 and master control unit 158 signals thermal control 112, stopping the flow of hot gases through heat exchanger 104 and starting the flow of coolant through the heat exchanger 104. This initiates the removal of heat from tank 92 and flow valve 130 is closed and flow valve 148 is opened allowing hydrogen in tank 88 to pass to tank 92 for regeneration of the metal hydride.

An additional advantage of the invention is that a large portion of the hydrogen used to fuel the vehicle is stored in microcavity hydrogen storage achieving a safety factor. It is known that highly explosive gases can be stored in microspheres because the spheres effectively quench the spread of flame necessary to maintain an explosion. If a vehicle carrying a large supply of hydrogen encapsulated in microspheres should get in an accident and the microsphere storage tank is ruptured, the hydrogen would not be released but would be safely retained inside the individual microspheres.

Figure 4:
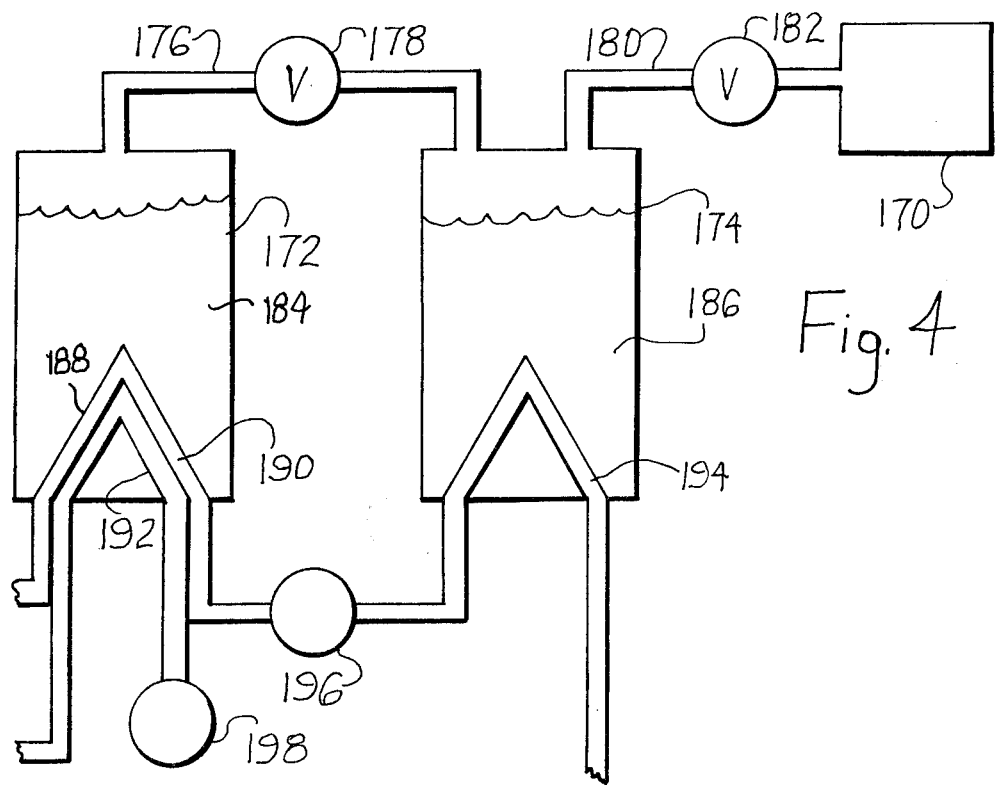
FIG. 4 is a schematic view of an alternate embodiment of the invention.

In an alternate embodiment shown in FIG. 4 hydrogen is delivered to an apparatus 170 utilizing a metal hydride hydrogen storage hydrogen supply component 172 is series with a microcavity hydrogen storage hydrogen supply component 174. The metal hydride component 172 is connected via lines 176 to microcavity hydrogen component 174. Interspaced in line 176 is a control valve 178. A second line 180 connects the microcavity hydrogen component 174 to the hydrogen utilizing apparatus 170. Interspaced in line 180 is a second control valve 182.

The component 172 contains a metal hydride 184 identical to hydrides as previously described. Component 174 contains a hydrogen microcavity storage 186 such as microspheres as previously described. Component 172 includes a heat exchanger 188 containing a heating portion 190 and a cooling portion 192 also identical to similar components as previously described. Component 174 contains a heater 194 as previously described and both heating element 190 and heater 194 are supplied with heat from a heat source 196 similar to that previously described. Cooling component 192 is supplied with coolant from coolant reservoir 198, again as previously described.

Hydrogen can be supplied to apparatus 170 directly from the microcavity storage component 186 by opening valves 182. Alternately hydrogen can be supplied to the apparatus 170 from the metal hydride component 172 by opening both valves 178 and 182. The metal hydride component 184 is recharged from the microspheres 186 by opening valve 178 while valve 182 is closed. The system can also utilize appropriate controls similar to those previously described for monitoring and regulating the flow of hydrogen.

For initial start up of the apparatus 170, when microcavity component 174 is charged with microspheres as the hydrogen supply component 186, the dead spaces inbetween the individual spheres can serve as the residual hydrogen storage reservoir. Thus, the microcavity component 174 can contain hydrogen at two different pressures—the first being high pressurized hydrogen inside of the microcavities, the second being low pressured hydrogen outside of the microcavities. This type of hydrogen reservoir can also be used with the other embodiments previously described.

In yet another embodiment of the invention only a single storage tank is used. Located within this storage tank would be both the metal hydride and a microcavity storage systems. This embodiment offers the advantage of having the metal hydride in immediate proximity to the microcavity which allows for direct exchange of hydrogen from the microcavities to the metal hydride and additionally, the heat released from the metal hydride as it absorbs hydrogen is used directly to heat up the microspheres to stimulate them to release additional hydrogen.

Typical glass microspheres will release hydrogen at slightly below 175° C. Thus in this system the metal hydride chosen would be one having a somewhat elevated dissociation temperature. Thus the energy released upon absorption of hydrogen would be of a slightly higher temperature than the temperature necessary to free the hydrogen from the microcavity storage. For this type of system metal hydrides based upon magnesium or one of its alloys are preferred.

I claim:

1. A process of supplying hydrogen from a hydrogen storage system including a storage means for containing hydrogen; said storage means including at least one hydrogen withdrawal conduit connected to said storage means for discharging said hydrogen from said storage means, a first compartment means, a second compartment means and a connecting means for connecting said first compartment means to said second compartment means, a microcavity hydrogen storage means located in said first compartment, said microcavity hydrogen storage means including a porous structure having a plurality of microcavities defined by closed pores surrounded by hydrogen permeable walls, said microcavities containing hydrogen under pressure encapsulated within the interior of their walls, said microcavities upon being heated capable of releasing the pressurized hydrogen encapsulated within their interiors; a quantity of a composition capable of forming at least one metal hydride when exposed to hydrogen located in said second compartment means, said metal hydride capable of releasing hydrogen when heated and absorbing hydrogen when cooled in the presence of hydrogen which comprises:

heating said microcavities to cause said pressurized hydrogen to diffuse through said permeable walls from the interior of said microcavities to the exterior of said microcavities;

allowing hydrogen to transfer between said first and said second compartments through said connecting means;

regulating the temperature of said composition in accordance with the pressure of said hydrogen in said second compartment means so that the pressure of hydrogen within said second compartment means remains substantially constant;

withdrawing hydrogen through said hydrogen withdrawal conduit for use external said hydrogen storage system.

2. The process of claim 1 wherein:
said microcavity hydrogen storage means comprises a plurality of microspheres.

3. The process of claim 2 wherein:
said microspheres consist of silicate glass microspheres.

4. The process of claim 1 wherein:
said microcavity hydrogen storage means comprises a porous structure having interconnecting pores and closed pores, said interconnecting pores providing access to said closed pores, said closed pores capable of containing hydrogen under pressure and releasing hydrogen to said interconnecting pores.

5. The process of claim 4 wherein:
said porous structure consists of a plurality of glass microspheres sintered together to form a unified body.

6. The process of claim 1 wherein:
said composition includes iron titanium hydride.

7. The process of claim 1 wherein:
said composition includes iron titanium hydride and said microcavities comprise a plurality of microspheres.

* * * * *